United States Patent [19]
Krieg et al.

[11] Patent Number: 5,430,278
[45] Date of Patent: Jul. 4, 1995

[54] BAR CODE, AS WELL AS PROCESS AND APPARATUS FOR READING THE SAME

[75] Inventors: Gunther Krieg, Im Rennich 12, 7500 Karlsruhe 41; Otmar Baldas, Karlsruhe; Andreas Hanke, Ettlingen, all of Germany

[73] Assignee: Gunther Krieg, Karlsruhe, Germany

[21] Appl. No.: 977,254

[22] Filed: Nov. 16, 1992

Related U.S. Application Data

[63] Continuation of Ser. No. 586,876, Sep. 24, 1990, abandoned.

[30] Foreign Application Priority Data

Sep. 23, 1989 [DE] Germany .................. 39 31 828.1

[51] Int. Cl.⁶ .................................................. G06K 7/08
[52] U.S. Cl. ............................... 235/449; 235/493
[58] Field of Search ............................ 235/449, 493

[56] References Cited

U.S. PATENT DOCUMENTS

| | | | |
|---|---|---|---|
| 3,188,616 | 6/1965 | Simon | 360/46 |
| 3,358,124 | 12/1967 | Smith et al. | 235/449 |
| 3,358,124 | 12/1967 | Smith et al. | 235/449 |
| 3,613,101 | 10/1971 | Leonard et al. | 235/493 |
| 3,860,796 | 1/1975 | Wallace et al. | 235/449 |
| 4,130,242 | 12/1978 | Mannion | 235/450 |
| 4,146,781 | 3/1979 | Machate | 235/439 |
| 4,218,612 | 8/1980 | Krehl et al. | 235/449 |
| 4,281,242 | 7/1981 | Mannion | 235/449 |
| 4,303,951 | 12/1981 | Hack | 360/46 |
| 4,314,289 | 2/1982 | Haynes | 360/46 |

FOREIGN PATENT DOCUMENTS

| | | |
|---|---|---|
| 0208157 | 1/1987 | European Pat. Off. |
| 0286842 | 10/1988 | European Pat. Off. |
| 2361703 | 3/1978 | France |
| 2617628 | 1/1989 | France |

*Primary Examiner*—Harold Pitts
*Attorney, Agent, or Firm*—Antonelli, Terry, Stout & Kraus

[57] ABSTRACT

A process in which by a bar code formed by bars are gaps located between them with different electromagnetic characteristics, an electromagnetic alternating field is produced and a measuring field variable by the bar code is detected. At lease one sensor is provided with a sensor core, an exciting coil subject to high frequency located thereon and in each case at least one sensor coil closely adjacent to the exciting coil. The bar code is formed by electrically conductive material bars placed on a carrier with gaps.

27 Claims, 8 Drawing Sheets

BAR CODE, AS WELL AS PROCESS AND APPARATUS FOR READING THE SAME

This is a continuation of application Ser. No. 586,876 filed Sep. 24, 1990, now abandoned.

FIELD OF THE INVENTION

The invention relates to a process for reading bar codes, in which the bar code is placed under a reading or sensing head and the code is read by the reading head and apparatus for reading a bar code of varying electromagnetic characteristics, as well as to a bar code.

BACKGROUND OF THE INVENTION

Optical bar codes are known. They consist of a plurality of narrow and wider lines and gaps, which are parallel juxtaposed. Generally the coding of an information in such bars and gaps is based on the binary principle.

SUMMARY OF THE INVENTION

The aim underlying the present invention essentially resides in providing bar code materials as well as a process and apparatus for reading the bar code material under conditions in which optical bar codes cannot be used.

According to the invention the problem is solved by a process of the aforementioned type, which is characterized in that by means of a bar code formed by bars and gaps located between them having different electromagnetic properties an electromagnetic alternating field is produced, while a bar code-variable measuring field is detected. An apparatus for reading a bar code of varying electromagnetic characteristics is characterized by at least one sensor with a sensor core, an exciting coil subject to high frequency action located thereon and at least one sensor coil directly adjacent to the exciting coil. A bar code according to the invention comprises electrically conductive material bars located on a carrier having spaces.

Thus, a process and a system for the inductive recognition of bar codes made from an electrically conductive and preferably metallic material are provided. The gaps or spaces between the electrically conductive material bars remain as the gaps of the preferably non-conducting, dielectric carrier material and can be moulded by means of such a material, which is also used as the surface layer. In particular the surface layer must not be made from a transparent material, but can instead be optically opaque.

If the bars are made from paramagnetic or diamagnetic, conductive material, preferably copper or some other good conducting material, then on introducing an alternating field via the sensor head into the said material eddy currents are produced therein, which weaken the magnetic field. In place of dielectric carrier and covering materials, it is also possible to use a ferromagnetic carrier and covering materials, e.g. high-grade steel, particularly under corrosive conditions. Optionally the carrier and covering material are separated from the bars by insulating coatings.

Fundamentally the bars can also be made from ferromagnetic material. In this case, as a result of the magnetic resistance reduction caused by the same, a field amplification is obtained, which is measured by the measuring coil. The carrier and covering material preferably comprises dielectric material, such as plastic or the like. However, it is also possible to use non-ferromagnetic, i.e. paramagnetic or diamagnetic carrier and covering material.

Although it is fundamentally possible to operate with an exciting field and a sensor field, the former produced by an exciting coil on the sensor core and the latter measured by a measuring coil, according to a preferred development of the invention for compensating the measuring coil current a reference field is measured by a reference coil. In general, the reference field is a field area, which is not influenced by the code bars and is, consequently, measured with a reference coil, which is further from the code bars than the measuring coil, so that the signal supplied by it is not influenced. In the absence of the bars to be measured, the reference coil is used for compensating the measuring field or for zero adjustment. The latter can take place purely mechanically, in that the measuring and reference coil with the member of turns and arrangement on the sensor core are such that in the absence of the bar code, the output signals of the secondary coils are adjusted to zero and are coupled in opposition to one another. The compensation or adjustment (when the bar code is absent), can also take place in combination with electrical measures or also purely electronically. In the former case different amplifiers can be located in one of the two branches or gain factors can act therein, while providing phase shifters. The reference and measurement signals are supplied to a differential amplifier, whose output signal (when the bar code is absent) is matched to zero.

With respect to the further electronic elements of the processing apparatus, there are devices for filtering out disturbing harmonic and common wave components (band-pass filters), a synchronous demodulator or a sample and hold circuit for rectifying the differential voltages and a low-pass filter or an equivalent means for filtering out the carrier frequency.

The rectified, purely emergency signal obtained is preferably used as a peak value detection, as known from DE-OS 36 01 083, to which express reference is made and whose disclosure is incorporated herein. The resulting TTL signal, which precisely represents the bar code, can be appropriately analyzed and, therefore, the information contained in the bar code can be recovered.

The code bar structure, e.g. with active Cu-bars can be obtained by placing the corresponding bars on a carrier. In addition, a complete, continuous bar code can be punched in one operation from a corresponding wall material. In addition, a corresponding structure can be sprayed by metallization onto a carrier, with the areas left free being covered by a mask. Finally, cold-welded Cu-structures can be produced in the base material by moulding and explosive shaping.

As has already been stated, the active Cu-structure can be used without a covering and can be surrounded by plastic. It is also possible to provide a V2A-sheet covering. The carrier can also be made from V2A sheeting, so that the active Cu-structure can be placed between two V2A sheets. There can finally be a spraying over and around the Cu-structure by means of V2A using a metallization process.

The application or connection of the active structure can take place non-positively, e.g. by clamping. It can also take place positively, in that the bars are introduced into corresponding slots of a carrier, such as, for example, of steel. It is also possible to use other detachable or non-detachable mounting supports, such as e.g. using a screwed or riveted covering. The covering can be bonded to the carrier. The materials can be joined with or without a filler metal, e.g. by soldering, welding and in particular plasma, roll spot, laser or electron beam welding.

While a single bar code can be placed on a carrier for forming a code card, in order to increase the information content of such a card, the latter can be provided with several juxtaposed code tracks, which in each case take up a corresponding part of the carrier height. The total number is determined by the maximum possible carrier height or width and the minimum admissible width of the code track or the height of the individual bars thereof. The juxtaposed code tracks can be serially read out. Moreover, all or part of the tracks of a code card can be read in parallel into several sensors, particularly in the multiplex process and subsequently electronically further processed.

According to a preferred development the code carrier can be constructed circular symmetrically, with the individual bars being formed by circular sectors. The sensors are preferably adapted to the code card structure and therefore constructed as circular sectors. The circular code cards can be held centrally, for example by a central punching and centred. The sensors are guided over the sane on a circular path.

BRIEF DESCRIPTION OF THE DRAWINGS

The invention is described in greater detail hereinafter relative to a non-limitative embodiment and the attached drawings, wherein:

FIG. 4a is a plan view of another embodiment of a sensor core according to the present invention;

FIG. 4b is a side view of the sensor core of FIG. 4a;

Figure 1:
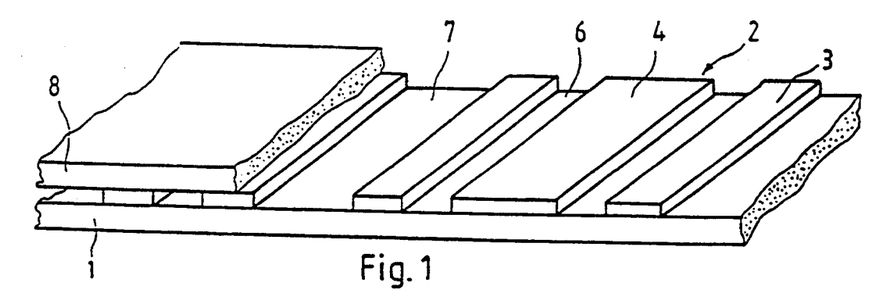
FIG. 1 is a perspective view of a bar code instruction in accordance with the present invention.

FIG. 1 shows on a planar, flat carrier 1 a bar cede 2 with bars 3, 4 having different or the sane width, which are separated from one another by intermediate areas or gaps 6, 7 also having the sane or different width. The bar code 2 is preferably covered by a covering 8, which in the same way as the material of the carrier 1 can fill the gaps 6, 7. The bars 3, 4 are made from a conductive material, namely either from a good conducting diamagnetic or paramagnetic material, such as copper or the like, or from ferromagnetic material. The carrier 1 and the covering 8 are generally made from non-conductive, i.e. dielectric material, such as in particular plastic, which must not be transparent.

In special cases with ferromagnetic material bars 3, 4, the carrier and covering can be made from other than dielectric, paramagnetic and diamagnetic materials, such as e.g. from copper. It is also possible for special purposes, particularly when used in a corrosive environment and in the case of diamagnetic or paramagnetic material bars to use high-grade steel for the carrier 1 and the covering 8.

Thus, a card can comprise a carrier plate 1, 8 made from high-grade steel, code bars 3, 4 from copper and between them, high-grade steel bar portions not shown placed in the spaces so as to form "code gaps", the copper being held in the high-grade steel bar portions by a not shown steel frame. Such an arrangement can be firmly connected by welding or beading, so that such a card is able to fulfill the maximum mechanical, chemical and thermal requirements.

The resolution or reading accuracy is concomitantly determined by geometrical quantities. The coating thickness of the code lines is preferably in the range 20 to 100 micrometres. The width of the bars 3, 4 and the spaces 6, 7 is preferably 0.5 to 1 mm, but can be up to 4 mm or more. While the carrier material can be of a random thickness, the covering 8 on the side on which the sensor head is engaged should be 0.1 to 2 mm. In the case of a card-like bar arrangement, the carrier material thickness will be of this order of magnitude. The length of the bars 3, 4 is substantially uncritical, bat is conventionally in the range 1 to 4 cm.

The bar code can be produced in a random, appropriate manner. The bars can be cut or punched from the corresponding material and subsequently e.g. melted in plastic. Production can also take place by etching, such as is used for producing printed circuit boards. It is also possible to use other suitable thick or thin film processes, together with bonding processes, as a function of the materials used.

Figure 2:
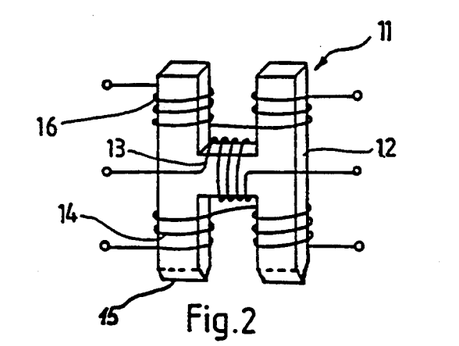
FIG. 2 is a perspective view an inductive sensor constructed in accordance with the present invention.

In FIG. 2, sensor 11 has a ferromagnetic material sensor core 12, which in the represented embodiment carries three coils 13, 14, 16. The core 12 is H-shaped. In order to reduce the stray effect of the magnetic field pattern and increase the spatial resolution, the H-core sensor can be "pointed" on one or both faces, in that it is provided with a saddle roof and a corresponding saddle edge 15, as shown in FIG. 2.

The coil 13 is wound as the exciting coil onto the H-web. A high frequency a.c. voltage is applied to the exciting coil 13. The latter builds up two separate magnetic circuits, which are in each case closed by the faces of adjacent legs of the H-core 12. On the two adjacent legs of the H-core is wound in each case, one of the coils 14, 16, with one of the coils (here 14) being the measuring coil and the other 16 a reference coil. As a result of the magnetic alternating field produced in the coil 13 via the high frequency a.c. voltage, in each case a voltage is induced in the coils 14, 16, which is zero adjusted in the case of the connection in opposition of the coils 14, 16.

An improvement is obtained by bringing about the coarse adjustment via the number of turns and the coil position and a precision adjustment by the summation of an amplitude and phase-position-adjustable correction signal.

Figure 3:
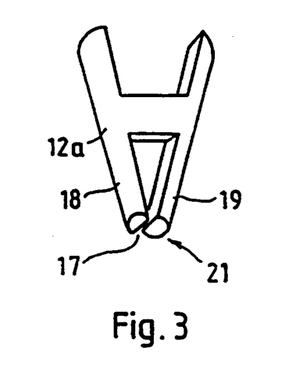
FIGS. 3 and 3a are perspective views of other embodiments of inventive sensor cores constructed in accordance with the present invention.

FIG. 3 shows a H-core 12a, which is basically shaped like an inverted A, but the side legs of the A are not in contact with one another in the vicinity of the tapering point and instead form a gap 17. The legs 18, 19 are also roughly semicircular in cross-section, so that the pointed area at 21 in all represents a circular surface with a diameter a.

Figure 3A:
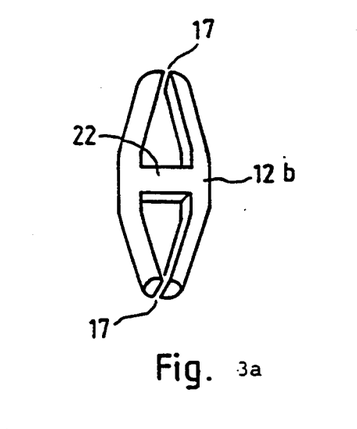

In the H-core 12b of FIG. 3a not only are two adjacent legs led towards one another, as in FIG. 3, but the two leg pairs are led towards one mother, so that the H tapers from its central web 22 to the ends of the legs. Here again the faces of the sensor core are almost circular with a slot 17.

Figure 4:
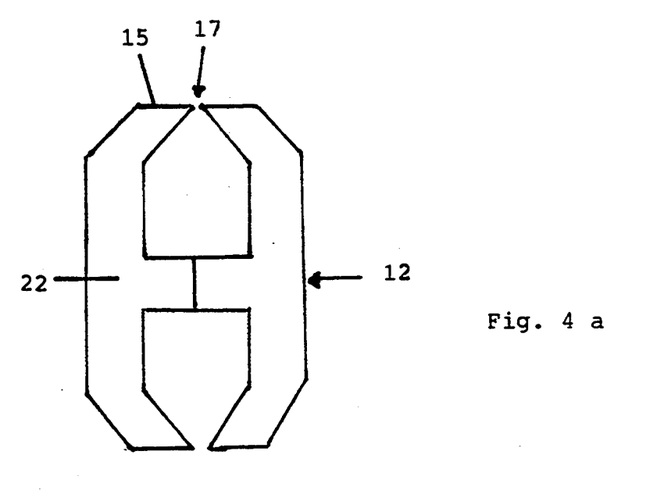

FIGS. 4a and 4b show a further H-shaped sensor construction. As in FIG. 3a, the legs are directed towards one another, in that their ends are angled. In addition, their end faces are "pointed" in accordance with FIG. 2 and form an edge 15. In this case the stray field losses between the legs are minimized.

Figure 5:
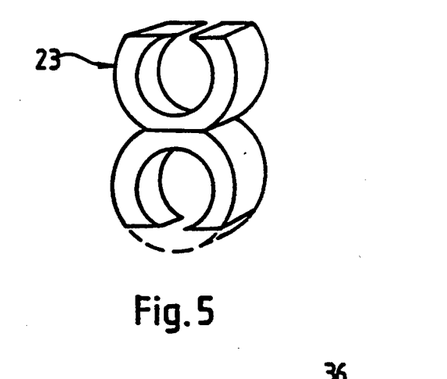
FIGS. 5 and 6 are perspective views of further embodiments of sensor cores according to the present invention.
Figure 6:
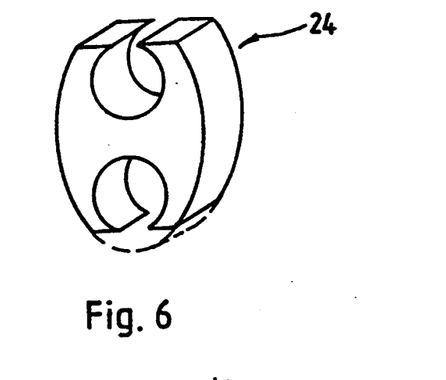
Figure 7:
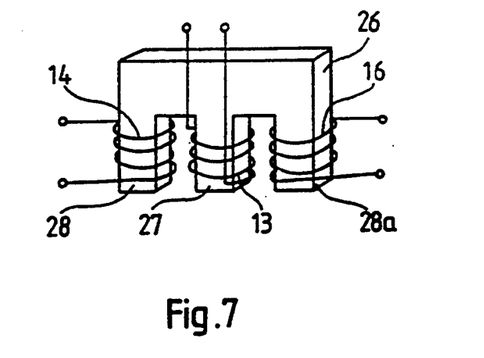
FIGS. 7 and 8 are perspective views of further embodiments of sensors constructed in accordance with the present invention.

Further shapes for H-shaped sensor cores 23, 24 are given in FIGS. 5 and 6. Here again the free ends of the legs are led towards one another, but in this case in arcuate manner, so that between the free ends of the legs is in each case formed a narrow air passage. Another configuration of a sensor core 26 is shown in FIG. 7. This core is not H-shaped, but E-shaped, the sensor core 26 being inserted in such a way that it stands on the free ends of its E-legs. The exciting coil 13 is wound around the central E-leg 27, while a coil is wound as the measuring or reference coil 14, 16 around a lateral E-leg 28, 28a. This E-core 26 is guided over the bar code in such a way that the central leg 17 is passed over the terminal edges of the bar code and the leg 28 carrying the measuring coil 14 is led along the bars, while the leg 28a carrying the reference coil is moved alongside the bars.

Figure 8:
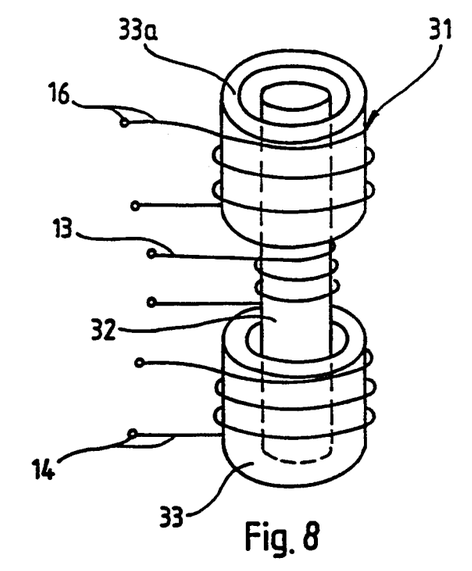

Another construction of a sensor core 31 is shown in FIG. 8. In this case the core part 32 carrying the exciting coil 13 is constructed as a rod, which is surrounded in its end regions by ring cores 33, 33a, which in each case carry the measuring and reference coil 14, 16.

Figure 9:
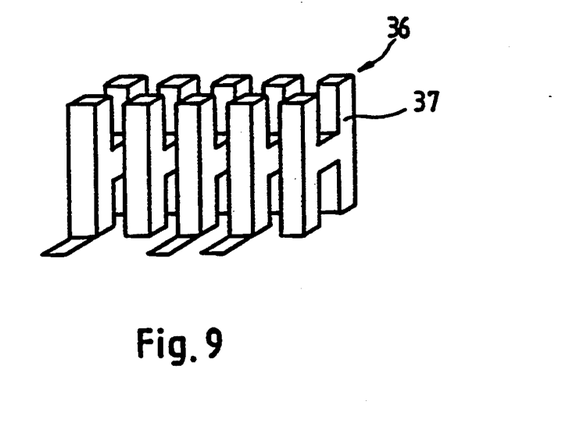
FIG. 9 is a perspective view of a stationary sensor constructed in accordance with the present invention.
Figure 10:
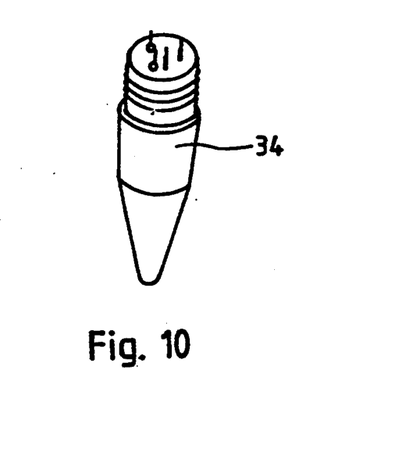
FIG. 10 is a perspective view of a sensor head for receiving one of the sensors of FIGS. 2-8.

While the aforementioned sensor cores 12, 12a, 12b, 23, 24, 26, 31 are moved relative to the bar code 2 and namely at right angles to the extension of the individual bars in order to be able to read the code (said cores being placeable in a sensor head 34 according to FIG. 10 or some similar sensor head), FIG. 9 shows a configuration in which the bar code and therefore the carrier carrying the same, together with a sensor arrangement 36 are kept stationary relative to one another during the measurement or reading of the bar code. Thus, the sensor arrangement 36 comprises a plurality of individual sensors 37, which are constructed in accordance with one of the aforementioned sensors, preferably one of the sensors of FIGS. 2 to 7. The dimensions of the H-shaped individual sensors 37 (it also being possible to use E-shaped individual sensors) at right angles to the plane reproducing the corresponding letter and the spacing between the sensors in the same direction, corresponds to the minimum bar and gap dimensions of the bars 3, 4 or the gaps 7, 6. Preferably, but not necessarily, the code bars and gaps represent an uneven multiple of the corresponding bars or gaps with the minimum transverse dimensions, so that the individual sensors arranged on either side of an individual sensor placed over a wide gap in each case come to rest over code bars.

The electronics (FIG. 11) has an oscillator 41 and a sine converter 42 associated therewith with which the oscillator signal is converted into a sine wave. The components can be realized by component NE 5521 of the Valvo company or some corresponding component. Alternatively the oscillator can be a Franklin LC oscillator modified in such a way that the primary coil of the sensor 11 is connected in parallel to the capacitor of the LC-oscillator are forms the oscillator inductance.

Working takes place with a high frequency, which is understood to mean frequencies in the range 5 to 100 KHz. In the specific embodiment a frequency of 58.8 KHz is used.

Figure 11:
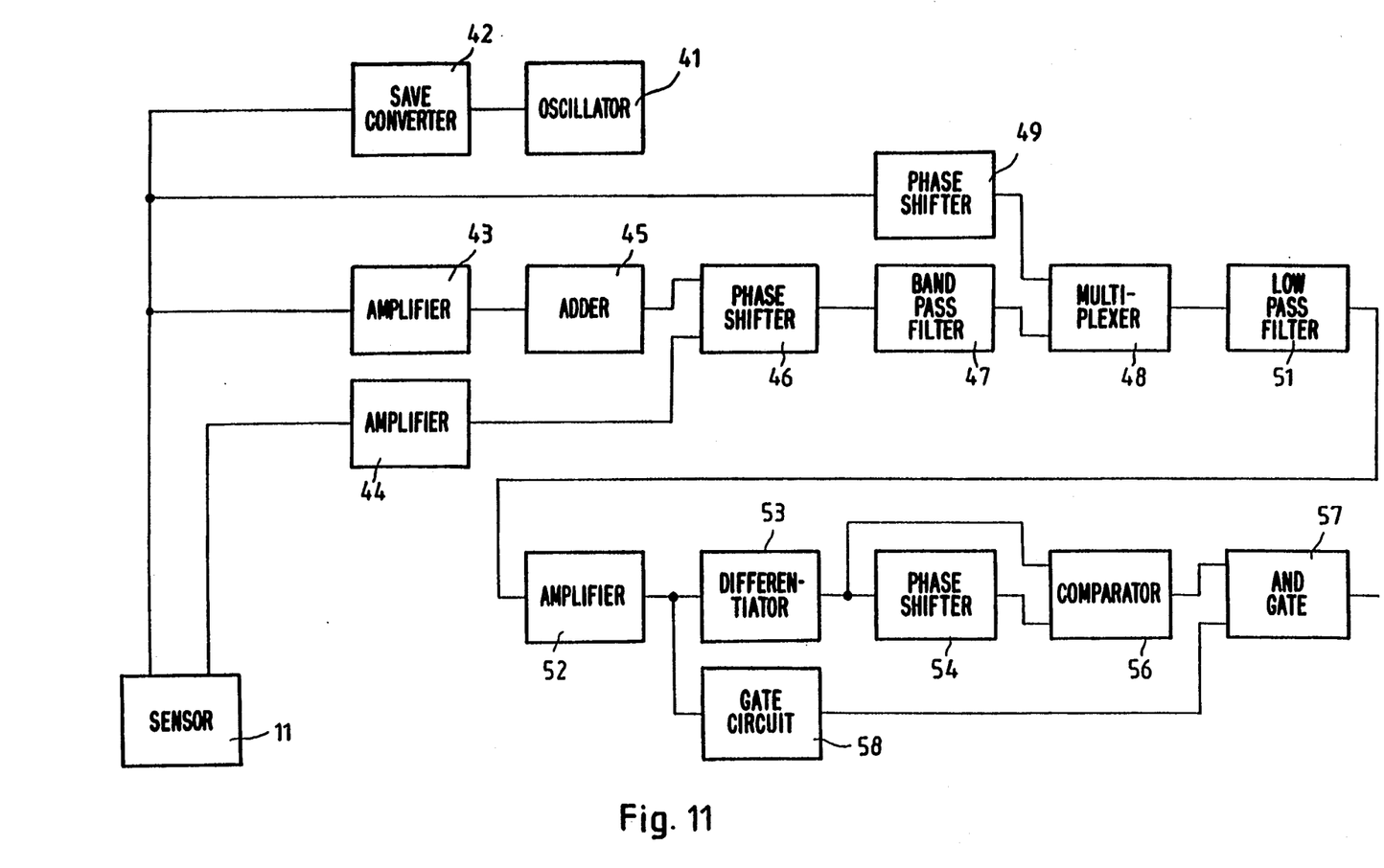
FIG. 11 is a block circuit diagram of an evaluation electronic arrangement constructed in accordance with the present invention.

The amplitude level is dependent on the operating voltage used and e.g. for a voltage of $+10$ V is approximately 6 $V_S$. A sensitivity rise can be obtained by operating the coils 13, 14, 16 in resonance by the parallel connection of suitable capacitors.

The secondary voltages (measurement and reference voltage) induced in the secondary coils 14, 16 (FIGS. 2, 7, 8) of the sensor 11 are separately supplied across separate amplifiers 43, 44 to a adder 45, one of the voltages being passed across a phase shifter 46, optionally in the form of an all-pass filter, in order to bring about a zero adjustment of the difference of the two voltages in the absence of the particular bar code. The amplitude value adjustment takes place through the modification of the gain factors in the different branches. In addition or as an alternative it is possible to choose the number of turns in an appropriate manner. In the case of a symmetrical H-core, the turns of the secondary coils 14, 16 are substantially the sane, whereas in the case of an asymmetrical construction (FIG. 13) different numbers of turns are chosen for zero adjustment purposes. If no parasitic capacitances are present, then the phase position of the voltages to one another and to the primary coil is equal to zero. If this is not the case, then it is necessary to carry out a phase correction by the phase shifter 46. Instead of carrying out a zero adjustment by means of a reference signal, it can also be carried out by a signal completely electronically simulating the same, or in that the measuring signal of the measuring coil is compensated purely electronically or on the basis of the signal acting on the primary coil. In this case there is no need for the reference coil 16. The output signal of the adder 45 is subsequently supplied to a band-pass filter 47 for filtering out interfering harmonic and common wave components.

In place of the aforementioned separate tapping of the two secondary signals from the reference and measuring coil, it is also possible to firstly so select the inductance of the exciting coil that the constant voltage source 41, 42 supplying the sine-wave voltage is not overloaded, which can be achieved by 150 to 200 turns of a copper lacquered wire with a diameter of 0.05 mm. If the loading is not too great, then there is no need for the exciting resonator circuit and therefore the capacitor connected in parallel to the exciting coil 13. This gives a low drift, stable input signal.

On the secondary side the two coils can be oppositely connected in series. To both of these is connected in parallel a common capacitor for producing a resonator circuit. In this case, in the absence of code bars, zero adjustment of the differential voltage can no longer take place electrically or electronically, but exclusively mechanically by varying the number of turns and the position of the coil. In the case of interference of a magnetic secondary circuit, the total inductance is modified in such a way that the output-side resonator circuit resonates. A high sensitivity is obtained. Then, in the case of detection, i.e. on disturbing the magnetic circuit by cede bars, the secondary circuit with measuring and resonance coil 14, 16 is operated into resonance, which reduces drift compared with the aforementioned circuit, in which the differential voltage is produced during detection in a circuit out of resonance. This substantially eliminates disturbing influences.

Optionally following further amplification, the adjusted signal is supplied to a synchronous demodulator 48 (multiplier) for rectifying the secondary differential voltage by means of the primary signal. As a function of the nature of the disturbance or interference to which is exposed the circuit 14 of the sensor 11, a different phase position is obtained between the primary and differential voltage. As the prerequisite for synchronous rectification is phase identity or phase difference of 180° between the primary and differential voltage, there must be a further phase correction between the primary and differential voltage and for this purpose in the represented embodiment a phase shifter 49 is provided in the circuit of the primary signal supplied from the sine converter 42. The phase shifter is preferably formed by an all-pass filter.

Following rectification, finally the carrier frequency is filtered out by a low-pass filter 51, which is followed by an inverting, preferably voltage-dependent amplifying amplifier 52.

The further processing of the output signal of the amplifier 52 takes place across a differentiator 53, a voltage-dependent phase shifter 54 and in a first embodiment a comparator 56 comparing the non-displaced signal with the signal displaced by the phase shifter 54 and which is followed by an AND-gate 57, which gates the comparator signal as a function of the switching state of a gate circuit 58 switched by the non-differentiated signal (output of 52). The outlet signal of the AND-gate is the desired TTL-signal corresponding to bar 3, 4, which can be passed on for further evaluation and identification of the signal sequence, e.g. to a computer.

Figure 12A:
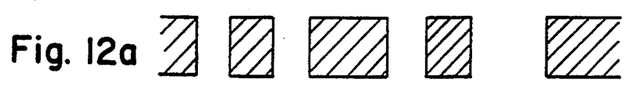
FIG. 12a is a schematic view illustrating an arrangement of conductive bar codes in accordance with the present invention.

FIG. 12b–12g show shows the signal pattern obtained with the inventive components of FIG. 11. FIG. 12a diagrammatically shows an arrangement of the electrically conductive bars of a bar code, the hatching corresponding to the copper tracks. The recording of this code with the sensor 11 gives a high frequency or carrier voltage modulated by the influence of its conductivity and corresponding to the code bars, which is rectified by the synchronous demodulator 48 and whose high frequency component is filtered out by the low-pass filter, so that downstream of said filter 51 is obtained the low frequency signal shown in FIG. 12b.

Figure 12B:
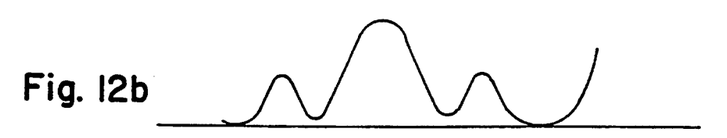
FIGS. 12b-12g are schematic representations of signal shapes occurring during electronic processing.

As can be gathered from FIG. 12b, the narrower compared with the wider copper tracks lead to a much weaker eddy current propagation and can therefore only be detected in the signal of FIG. 12b as small, narrow, positive peaks. As for the further processing with the differentiator the signal edges of FIG. 12b cannot be cleanly processed, via the inverting amplifier 52 there is a voltage-dependent amplification, so that the narrow, relatively low peaks undergo greater amplification, i.e. are raised more than the wide peaks, without the latter passing into the negative boundary after inversion. The addition of an additional offset voltage aids the desired effect in that in the positive range there is a very high amplification or gain, whereas in the negative area it passes approximately logarithmically almost to 1 to the maximum output voltage of $-3.3$ V. The voltage-dependent, inverting amplifier 52 in this way supplies the signal of FIG. 12c.

Figure 13:
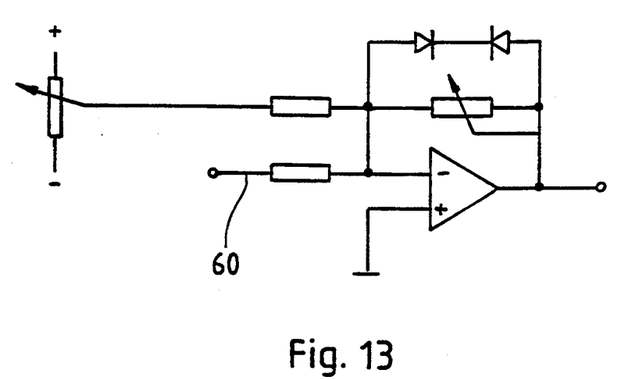
FIG. 13, is a schematic view of a circuit of a voltage-dependent inverting amplifier.

A preferred circuit for the amplifier 52 is shown in FIG. 13, in which OP is an operational amplifier, e.g. of type TL 084, with D1 being a silicon diode (e.g. 1 N 41 48) and D2 a Zener diode (e.g. ZPD 3,3). The input 6 coming from the synchronous demodulator or the series-connected low-pass filter 49 is passed to the negative input of the operational amplifier, while the positive input is at a fixed value (inversion). The voltage-dependent amplification takes place across D1 and D2, while the offset voltage is adjustable by the potentiometer P to the left.

Figures 12C, 12D:
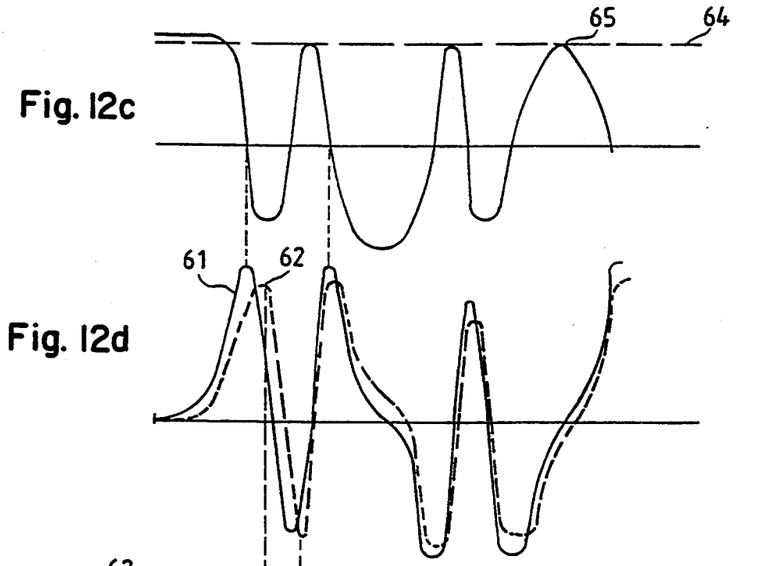

The signal differentiated by the differentiator 53 is shown as signal 61 in FIG. 12d. The latter also shows as a phase-shifted signal 62 the output signal of the voltage-dependent phase shifter.

Figure 14:
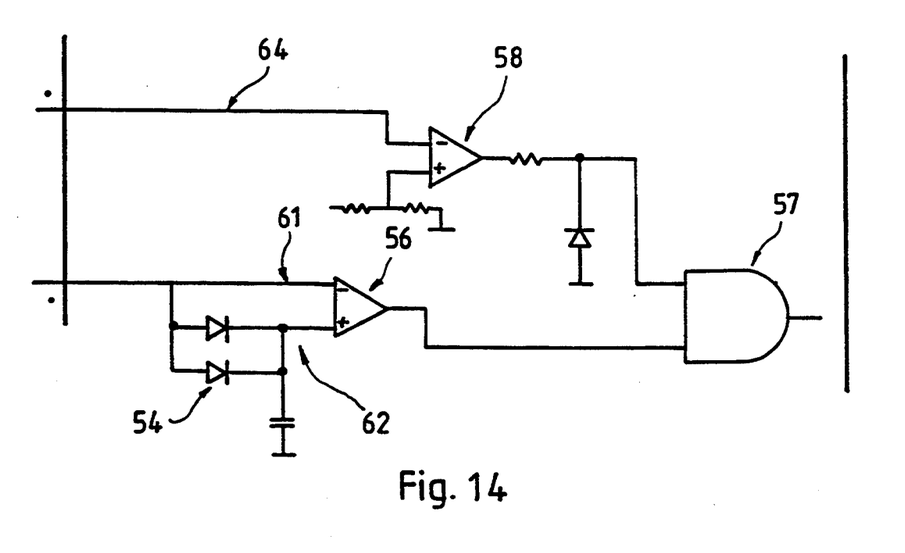
FIG. 14, is a schematic view of a further circuit diagram constructed in accordance with the present invention.

A preferred construction of a voltage-dependent phase shifter for the circuit of FIG. 11 can be gathered from FIG. 14, where the series-connected comparator 56 is shown alongside the phase shifter 54. The latter comprises two antiparallel diodes D3, D4, which are connected with a capacitor C to form a RC-combination.

If the voltage amount of the input signal is higher than a predetermined value (e.g. 0.7 V), then one of the two diodes is conductive, which gives a slight forward resistance. The RC-combination formed gives a limited phase displacement to the input signal 61 (FIG. 12c). However, if the voltage amount of the input signal is smaller than the aforementioned voltage value, then both diodes are blocked. This gives a high back resistance, so that the RC-combination leads to a high phase displacement to the input signal 61. Thus, also in the saddle area where they are almost parallel the differentiated signals are drawn adequately far apart, so that they do not cross or intersect and the comparator is not subject to any switching processes in this area and the phase displacement is shall in the peak areas of the differentiated signal. The displaced and undisplaced signal cross close to their maxima and the comparator switches at this intersection point. As a result of the limited displacement produced in this area, the switching point of the comparator 56 very accurately reproduces an edge in the output bar code.

Figure 12E:
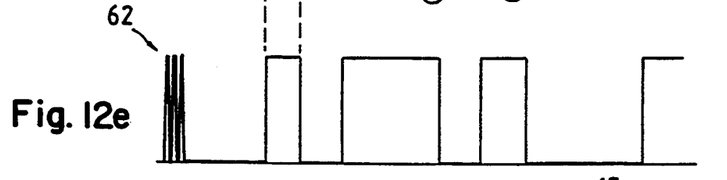
Figure 12F:
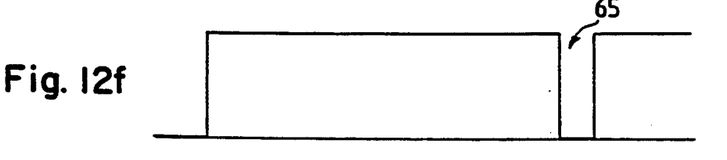

The voltage-dependent phase shifter 54 can be modified by the selection and number of the antiparallel-directed diodes with respect to the voltage range where there is a phase displacement change, whereas through the series connection of resistors to the diodes the phase displacement can be varied in both areas. The comparator signal is shown in FIG. 12e.

Compared with a possible peak value detection a simpler construction is obtained and a more reliable determination of the positive and negative peaks, even if their values or intensities fluctuate considerably. Undesired switching points are reliably excluded and it is easy to carry out an adaptation to the particular problems involved.

As the above-described phase displacement cannot avoid an undesired "clocking" of the comparator in the case in which no decoding takes place (as indicated at 63 in FIG. 12e) and so that the complete apparatus does not have to be switched off on each occasion, the gate circuit 58 shown in FIG. 11 can be used. By means of this the voltage-dependent amplified and inverted analog signal according to FIG. 12c is compared with a fixed, predeterminable threshold 64 and the comparator only opens if the inverted analog value is below the threshold, whereas, it closes if an inverted "zero value" of the signal is above the threshold, so that it does not supply an output signal and consequently the AND-gate closes in this case of no measurement. If relative maxima of the inverted analog signal exceed the threshold according to FIG. 12c, so that the comparator supplies no positive signal, such a case (at 65 in FIG. 12c and 12f) always occurs outside the peaks of the signal of the comparator 56 defined by the edges, so that this case is admissible and leads to the fading out of no information.

Figure 12G:
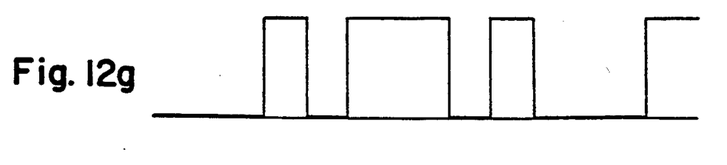

The TTL output signal supplied by the AND-gate 57 is spawn in FIG. 12g and can, as stated, be further processed, e.g. in a computer.

An alternative circuit for preventing the clocking of the comparator provides for the gate circuit between the voltage-dependent phase shifter and the comparator to be replaced by an adder, which superimposes a negative offset voltage on the voltage-dependent, phase-shifted differential signal 62, so that also the "zero values" of the unshifted and the phase-shifted signal are intensitywise "drawn apart" in their values. In this case the voltage-dependent phase shifter is terminated by an impedance converter, whose output supplies the input signal of the adder (not shown in detail). In this case the TTL-output signal of the comparator 56 can be directly used for further processing.

The further processing of the signal according to FIG. 12c following an amplifier 52 can take place by peak value detection, as explained in DE-OS 37 23 348 for an optical bar code reading system and express reference is made thereto. The resulting, desired TTL signal corresponding to the bars 3, 4 is passed on for further evaluation and detection of the signal sequence, e.g. to a computer. It is pointed out that the combinatorial circuit 38 of DE-OS 37 23 348 was provided for suppressing the influence of the individual matrix printer points read there and as the problems associated therewith do not occur here, said component is not necessary.

Figure 15:
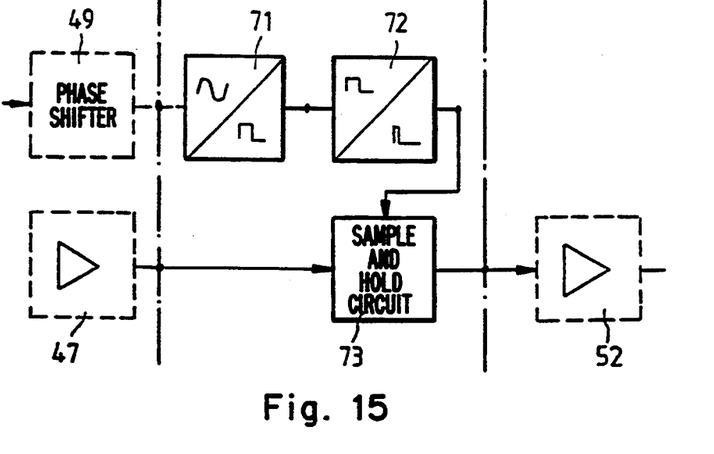
FIG. 15, is a schematic block circuit diagram of another circuit part.

The synchronous demodulator 48 and the low-pass filter 51 of FIG. 11 can be replaced in the manner shown in FIG. 15 by a squaring circuit 71, a following retriggerable monoflop 72 in the exciting circuit and a sample and hold circuit 73, which is timed by the timing or clock of the monoflop 72. The output signal of circuit 73 corresponds to that of FIG. 12d.

Figure 16:
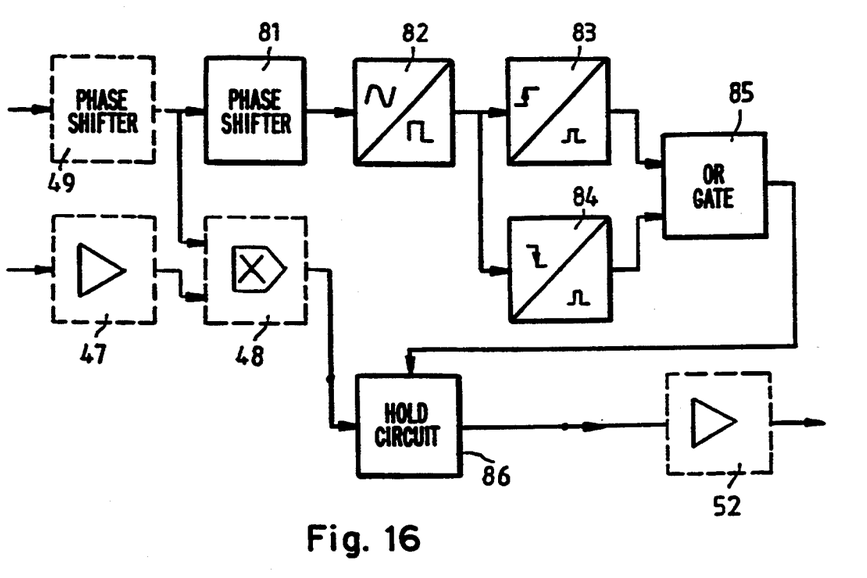
FIG. 16, is a block diagram of a further circuit part.

A further alternative consists of retaining the synchronous demodulator of FIG. 11, but replacing the low-pass filter by correcting the exciting signal optionally via a further phase shifter 81 relative to the measuring or differential signal, a squaring circuit 82 in the exciting circuit and following the sane a frequency doubling circuit with parallel-arranged, oppositely connected monoflop 83, 84 and a following OR-gate 85 for producing the clock for a sample and hold circuit 86 in the measuring signal circuit (FIG. 16).

Figure 17:
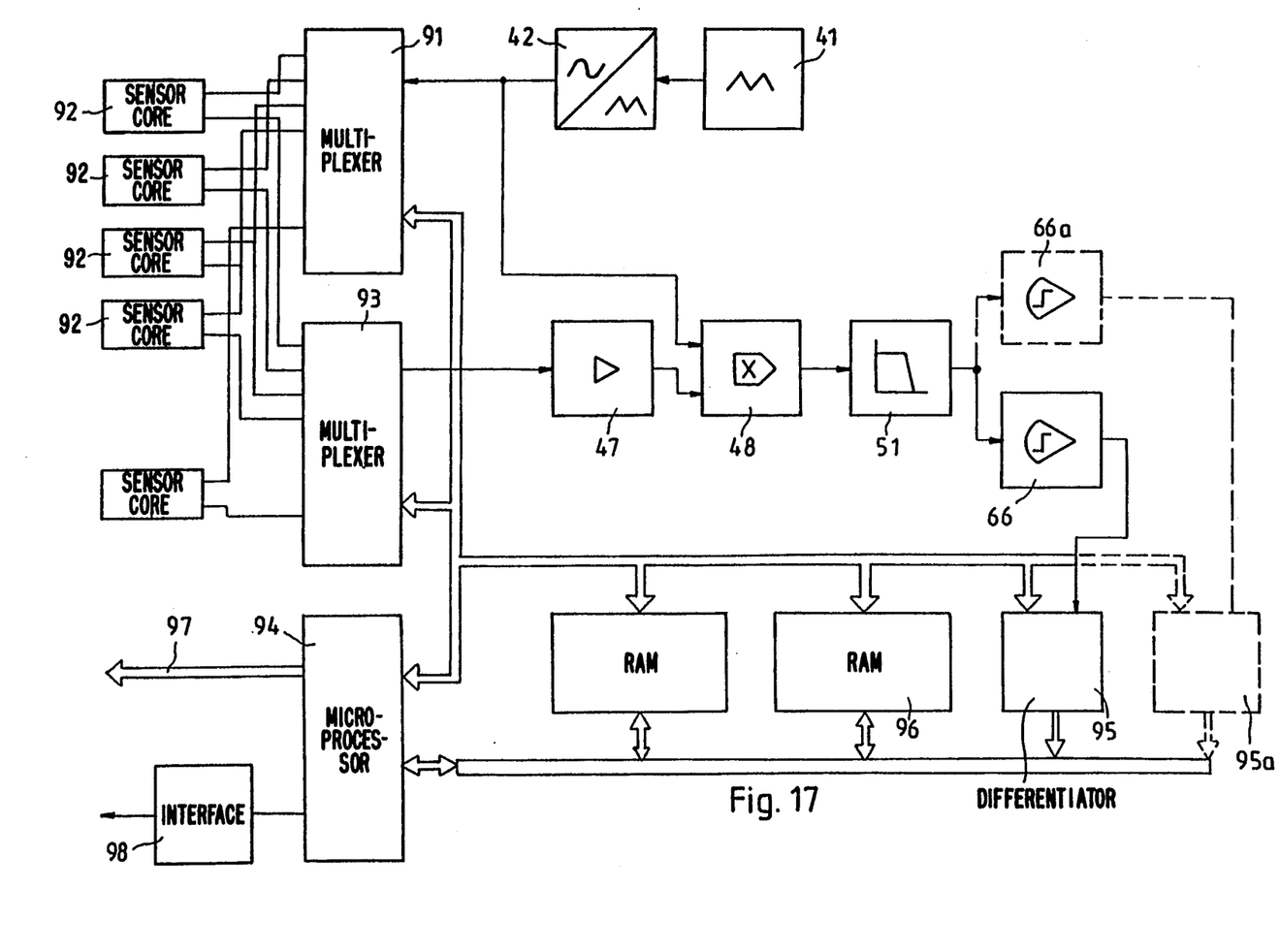
FIG. 17 is a block circuit diagram of an electronic evaluation unit for a stationary sensor unit according to FIG. 9.

In a static reading head, as explained with reference to FIG. 9, the individual sensors are successively interrogated with respect to their state by means of a multiplexer (FIG. 17 ). For this purpose a demilled multiplexer 91 is connected downstream of the sine converter 42 in the exciting circuit and successively allocates the exciting signal to the individual sensor cores 92, while in corresponding sequence the measuring and optionally reference coils 14, 16 of the individual sensors 92 are interrogated by the multiplexer 93. The sequence control takes place by a microprocessor 94. The further processing of the signals takes place via the amplifier 47, the synchronous demodulator 48 and the low-pass filter 51 or one of the aforementioned equivalent circuits for said components. As the individual sensors are kept stationary over the code bars or gaps during reading, the zero adjustment can directly take place mechanically at the sensor. The differentiated voltage is represented in the aforementioned manner (circuit blocks 66, 95). The corresponding digital states of the individual sensors are filed in a memory 96 (RAM). From here they can be further processed by means of a parallel or serial interface 97, 98.

In the case of a stationary sensor arrangement with E-shaped sensor cores, the exciting winding is located on the middle leg. The secondary windings on the two outer legs must be treated symmetrically, so that their circuit parts 66, 95 are arranged in parallel on corresponding faces 66a, 95a. It is important that the positioning accuracy relative to the bar code is respected, i.e. one of the two outer legs together with the middle leg is positioned above the bar, while the other is positioned outside the scene.

We claim:

1. Process for reading a bar code including diamagnetic or paramagnetic bars and gaps therebetween, said diamagnetic or paramagnetic bars having different electrical conductivities, the process comprising the steps of:
    bringing the bar code under a combined generating and reading head,
    generating an electromagnetic A.C. field by the bar code, said electromagnetic A.C. field generating a rotational field in the electrically, conducting bars of the bar code, and
    detecting at the same time the generated rotational field as a measuring field altered by the bar code, thereby enabling the bar code to be read by said combined generating and reading head,
    whereby said bar code having different electrical conductivities is brought under said combined generating and reading head and said electromagnetic A.C. field is generated by the bar code and generates said rotational field in the electrically conducting bars of the bar code and the generated rotational field is simultaneously detected as the measuring field altered by the bar code so as to enable the bar code to be read by said combined generating and reading head.

2. Process according to claim 1, further comprising the step of compensating the measuring field to zero at a position remote from the bar code.

3. Process according to claim 2, further comprising the step of detecting a reference field not influenceable by the bar code, and adjusting a measuring field to zero.

4. Process according to claim 2, wherein the measuring field is purely electronically compensated to zero.

5. Process according to one of claims 1 or 2, wherein several juxtaposed exciting fields are produced through the bar code in a fixed spacing and at right angles to an extension of individual bars of the bar code, and wherein measuring signals are taken.

6. Process according to claim 4, wherein exciting fields are produced and the measuring signals tapped.

7. Apparatus for reading a bar code including diamagnetic or paramagnetic bars and gaps, with the diamagnetic or paramagnetic bars having different electrical conductivities, the apparatus comprising:
at least one combined sensor means including a sensor core,
an exciting coil exposed to high frequency located on said sensor core, and
at least one sensor coil disposed closely adjacent to the exciting coil on the same sensor core,
whereby said high frequency voltage is applied to said exciting coil to produce a magnetic alternating field to induce a voltage in the one sensor coil being disposed closely adjacent to the exciting coil on the sensor core.

8. Apparatus according to claim 7, wherein the at least one sensor coil is provided on the sensor core, and wherein said at least one sensor coil includes a measuring and a reference coil.

9. Apparatus according to one of claims 7 or 8, wherein the sensor core is H-shaped, and the exciting coil is disposed on a web of the H-shaped core, and the at least one sensor coil is disposed on the legs of the H-shaped core.

10. Apparatus according to claim 9, wherein the sensor core tapers in an A-shaped manner at least to one end of adjacent legs of the H-shaped core, and wherein a gap is provided between portions of the legs of the sensor core.

11. Apparatus according to claim 10, wherein the sensor core tapers from the web in a direction of free ends of the legs.

12. Apparatus according to claim 10, wherein an end face formed by adjacent legs of the sensor core forms a circle provided with a slot.

13. Apparatus according to one of claims 7 or 8, wherein the sensor core is E-shaped, and wherein windings of the sensor coils are placed on legs of the E-shaped sensor core.

14. Apparatus according to one of claims 7 or 8, wherein the sensor is constructed symmetrically with an exciting rod, and wherein measuring cylinders surround the ends of the exciting rod.

15. Apparatus according to claim 8, wherein the coil are bonded to the sensor core.

16. Apparatus according to claim 8, wherein a parallel connection of capacitors is provided to the coils.

17. Apparatus according to one of claims 7 or 8, wherein means are provided for enabling a zero adjustment of a measuring voltage.

18. Apparatus according to claim 8, wherein the reference and measuring coils are oppositely connected in series.

19. Apparatus according to one of claims 7 or 8, further comprising series-connected phase shifters and differential amplifiers.

20. Apparatus according to one of claims 7 or 8, further comprising a peak value detection device with a series connected flip-flop.

21. Bar code, comprising a carrier, a plurality of bars disposed on said carrier and being respectively separated by a gap, said bars being formed of electrically conductive material, wherein the electrically conductive material of the respective bars are different from each other, and wherein the gaps are optionally filled with another material, whereby said bars of said bar code receive a high frequency voltage and said high frequency voltage is modified by said electrically conductive material.

22. Bar code according to claim 21, wherein each of the bars are covered by a top coating.

23. Bar code according to one of claims 21 or 22, wherein the bars are made from one of a paramagnetic and diamagnetic material.

24. Bar code according to one of claims 21 or 22, wherein the bars are made from a ferromagnetic material.

25. Bar code according to claim 22, wherein at least one of the carrier and the coating is made from dielectric material.

26. Bar code according to claim 22, wherein at least one of the carrier and the coating is made from a ferromagnetic material.

27. Bar code according to claim 22, wherein at least one of the carrier and the coating is made from paramagnetic or diamagnetic material.

* * * * *